(12) United States Patent
Deville et al.

(10) Patent No.: US 11,365,340 B2
(45) Date of Patent: Jun. 21, 2022

(54) METHODS AND COMPOSITIONS INCLUDING ASSOCIATIVE POLYMERS

(71) Applicant: Halliburton Energy Services, Inc., Houston, TX (US)

(72) Inventors: Jay Paul Deville, Spring, TX (US); Hui Zhou, The Woodlands, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/759,657

(22) PCT Filed: Jun. 6, 2019

(86) PCT No.: PCT/US2019/035689
§ 371 (c)(1),
(2) Date: Apr. 27, 2020

(87) PCT Pub. No.: WO2020/246977
PCT Pub. Date: Dec. 10, 2020

(65) Prior Publication Data
US 2021/0079284 A1    Mar. 18, 2021

(51) Int. Cl.
*C09K 8/82* (2006.01)
*C09K 8/34* (2006.01)
*C09K 8/035* (2006.01)

(52) U.S. Cl.
CPC .............. *C09K 8/34* (2013.01); *C09K 8/035* (2013.01); *C09K 8/82* (2013.01)

(58) Field of Classification Search
CPC . C09K 8/34; C09K 8/035; C09K 8/82; C09K 8/64; C09K 8/502; C09K 2208/18; C09K 8/32
See application file for complete search history.

(56) References Cited

U.S. PATENT DOCUMENTS

| 6,417,268 | B1 | 7/2002 | Zhang et al. | |
|---|---|---|---|---|
| 10,087,310 | B2 * | 10/2018 | Kornfield | C10L 1/1976 |
| 2009/0107671 | A1 * | 4/2009 | Waters | C09K 8/685 166/280.1 |
| 2011/0114318 | A1 * | 5/2011 | Ezell | C09K 8/512 166/305.1 |
| 2013/0005616 | A1 * | 1/2013 | Gaillard | C08F 220/56 507/225 |
| 2013/0130950 | A1 | 5/2013 | Chen et al. | |

FOREIGN PATENT DOCUMENTS

| WO | 2016/195713 A1 | 12/2016 |
|---|---|---|
| WO | 2016/198688 A1 | 12/2016 |
| WO | WO 2016/195713 | * 12/2016 |

OTHER PUBLICATIONS

Wei, Ming-Hsin, et al. "Megasupramolecules for safer, cleaner fuel by end association of long telechelic polymers" Science 350.6256 (2015): 72-75.
International Search Report and Written Opinion issued in related PCT Application No. PCT/US2019/035689 dated Mar. 6, 2020, 12 pages.

* cited by examiner

*Primary Examiner* — Kumar R Bhushan
(74) *Attorney, Agent, or Firm* — Tenley Krueger; C. Tumey Law Group PLLC

(57) ABSTRACT

Methods and compositions for modifying the rheological properties of non-aqueous fluids for treating subterranean formation are provided. In one or mom embodiment, the compositions comprise a non-aqueous fluid; a weighting agent; and one or more associative polymers that are capable of associating to form one or more supramolecular assemblies. In one or more embodiments, the methods comprise introducing a treatment fluid into a wellbore penetrating at least a portion of a subterranean formation, wherein the treatment fluid comprises a non-aqueous fluid and one or more associative polymers.

12 Claims, 1 Drawing Sheet

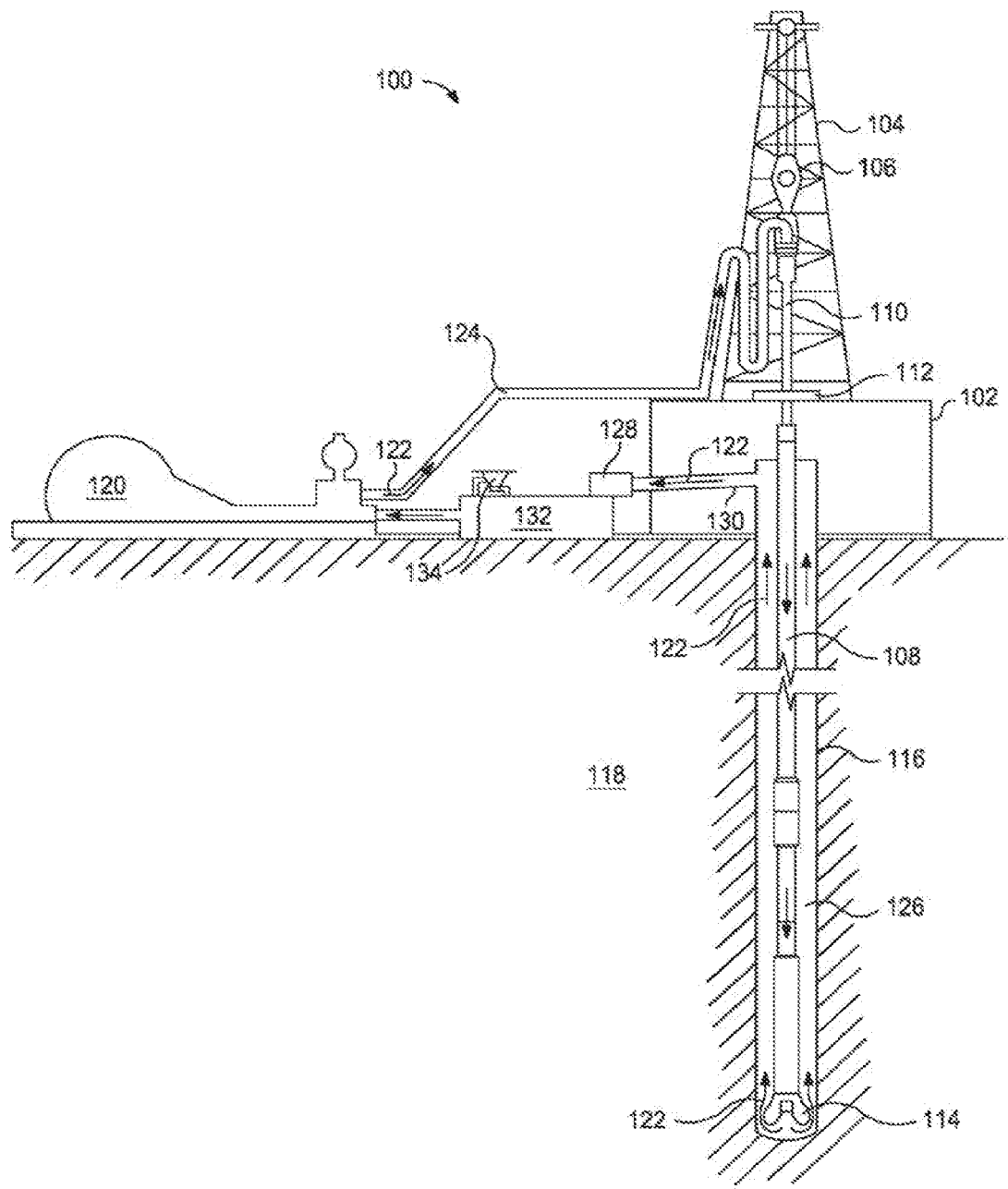

METHODS AND COMPOSITIONS INCLUDING ASSOCIATIVE POLYMERS

CROSS-REFERENCE TO RELATED APPLICATION

The present application is a U.S. National Stage Application of International Application No. PCT/US2019/035689 filed Jun. 6, 2019, which is incorporated herein by reference in its entirety for all purposes.

BACKGROUND

The present disclosure relates to compositions for treating a subterranean formation and methods of preparing the same.

Treatment fluids may be used in a variety of subterranean treatment operations. As used herein, the terms "treat," "treatment," "treating," and grammatical equivalents thereof refer to any subterranean operation that uses a fluid in conjunction with achieving a desired function and/or for a desired purpose. Use of these terms does not imply any particular action by the treatment fluid. Illustrative treatment operations may include, for example, fracturing operations, gravel packing operations, acidizing operations, scale dissolution and removal, consolidation operations, and the like. For example, a fluid may be used to drill a well bore in a subterranean formation or to complete a well bore in a subterranean formation, as well as numerous other purposes.

While drilling an oil or gas well, a drilling fluid (or drilling mud) is typically pumped down to a drill bit during drilling operations and flowed back to the surface through an annulus defined between a drill string and the walls of the wellbore. Drilling fluids often include viscosifiers to, for example, improve the ability of the drilling fluid to remove cuttings from the wellbore and suspend cuttings and weight materials in the drilling fluid, for example, during periods of non-circulation.

BRIEF DESCRIPTION OF THE DRAWINGS

These drawings illustrate certain aspects of some of the embodiments of the present disclosure and should not be used to limit or define the claims.

FIG. 1 is a diagram illustrating an example of a drilling assembly that may be used in accordance with certain embodiments of the present disclosure.

While embodiments of this disclose have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF CERTAIN EMBODIMENTS

The present disclosure relates to methods and compositions for treating subterranean formations. More particularly, the present disclosure relates to methods and compositions for modifying the rheological properties of non-aqueous fluids for treating subterranean formations.

The present disclosure provides methods and compositions for modifying the viscosity of non-aqueous fluids by including one or more associative polymers in the fluid. As used herein, the term "associative polymer" refers to one or more polymers that are capable of self-assembling into one or more supramolecular assemblies through one or more associative interactions. In particular, associative polymers may be capable of forming such assemblies without the need for (although not excluding the optional presence of) additional molecules or species (e.g., crosslinkers). The compositions of the present disclosure may generally include a non-aqueous fluid and one or more associative polymers. The methods of the present disclosure generally include: introducing a treatment fluid including a non-aqueous fluid and one or more associative polymers into a wellbore penetrating at least a portion of a subterranean formation. In some embodiments, the methods of the present disclosure may also include drilling at least a portion of the wellbore penetrating the subterranean formation with the treatment fluid.

Among the many potential advantages to the methods and compositions of the present disclosure, only some of which are alluded to herein, the methods and compositions of the present disclosure may improve properties of non-aqueous fluids by reducing the fluid rheology at high shear conditions while maintaining the fluid rheology at low shear conditions, or by increasing the fluid rheology at low shear conditions while maintaining the fluid rheology at high shear conditions. In certain embodiments, the modification of the fluid rheology may be nearly instantaneous and/or reversible. In one or more embodiments, the desired modification of the fluid rheology may be achieved with a very low concentration of associative polymers in the fluids, such as hundreds to thousands of parts per million. In one or mom embodiments, the modification of the fluid rheology may be achieved within the subterranean formation without damaging the surrounding formation.

In one or more embodiments, the treatment fluids of the present disclosure may be used to treat at least a portion of a subterranean formation. Such treatment fluids may include, but are not limited to, drilling fluids, completion fluids, gravel pack fluids, loss circulation fluids, pills, fracturing fluids, plugging fluids, cementing fluids, and abandonment fluids. As used herein, the terms "treat," "treatment" and "treating" refer to any subterranean operation that uses a fluid in conjunction with achieving a desired function and/or for a desired purpose. The use of these terms does not imply any particular action by the treatment fluid.

The treatment fluids used in the methods and compositions of the present disclosure may include a non-aqueous fluid. Non-aqueous fluids that may be suitable for use in the method of the present disclosure may include, but are not limited to, oils, hydrocarbons, organic liquids, and the like, and any combination thereof. In certain embodiments, the non-aqueous fluid may be the base fluid of the treatment fluid. The term "base fluid" refers to the major component of the fluid (as opposed to components dissolved and/or suspended therein) and does not indicate any particular condition or property of that fluids such as its mass, amount, pH, etc. In other embodiments, the non-aqueous fluid may be an oil phase of water-in-oil (i.e., invert) emulsion or an oil phase of an oil-in-water emulsion. In such embodiments, the emulsion may in turn be the base fluid of the treatment fluid.

The invert emulsions of the present disclose may include water, e.g., an aqueous phase, in any suitable proportion of the invert emulsion as will be appreciated by one of skill in the art with the benefit of this disclosure. In certain embodiments, the water may be present in the invert emulsion in an amount from about 0.01% to about 30% by volume of the invert emulsion. In other embodiments, the water may be present in the invert emulsion in an amount from about 10% to about 40% by volume of the invert emulsion. In other embodiments, the water may be present in the invert emulsion in an amount from about 20% to about 30% by volume of the invert emulsion.

The oil-in-water emulsions of the present disclosure may include oil in any suitable proportion of the emulsion as will be appreciated by one of skill in the art with the benefit of this disclosure. In certain embodiments, the oil may be present in the emulsion in an amount from about 0.01% to about 50% by volume of the emulsion. In other embodiments, the oil may be present in the emulsion in an amount from about 10% to about 40% by volume of the emulsion, in other embodiments, the oil may be present in the emulsion in an amount from about 20% to about 30% by volume of the emulsion.

The treatment fluids used in the methods and compositions of the present disclosure may include one or more associative polymers. In certain embodiments, the associative polymers used in the methods and compositions of the present disclosure may be an associative polymer disclosed in U.S. Pat. No. 10,087,310, which is hereby incorporated by reference in its entirety for all purposes. In certain embodiments, the associative polymers used in the methods and compositions of the present disclosure may be a linear or branched associative polymer that includes a linear, branched, or hyperbranched polymer backbone having at least two ends and functional groups presented at two or more ends of the backbone. In certain embodiments, at least two ends of the associative polymers may be separated by a polymer backbone having a length of at least 2,000 bonds and/or a polymer backbone having a weight average molar mass of equal to or greater than about 100,000 g/mol. In certain embodiments, the polymer backbone may be a nonpolar linear, branched or hyperbranched polymer or copolymer providing a number of flexible repeat units between associative functional end groups. Exemplary architectures of the associative polymers used in the methods and compositions of the present disclosure may include, but are not limited to:

(i)

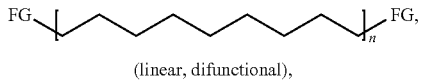

(linear, difunctional), (ii)

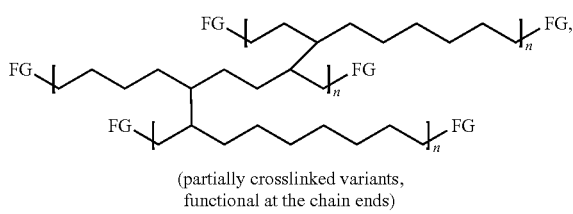

(partially crosslinked variants,
functional at the chain ends)

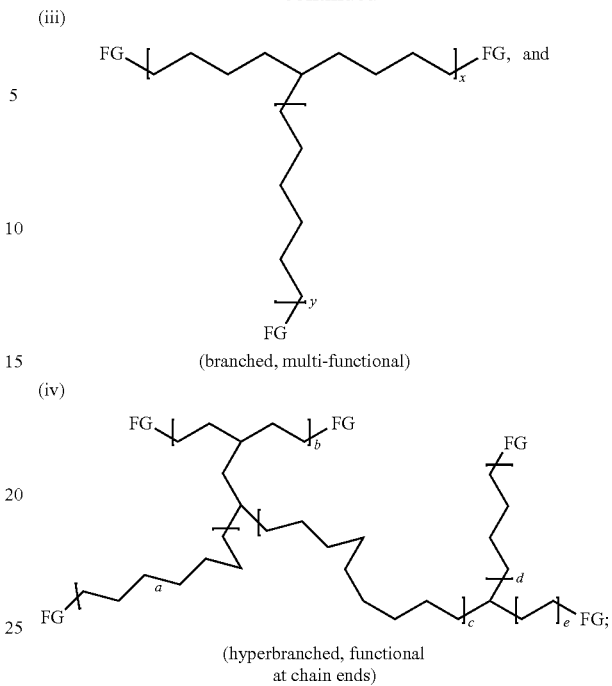

(iii) (branched, multi-functional)

(iv) (hyperbranched, functional at chain ends)

wherein

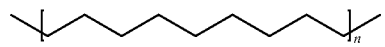

represents a suitable polymer backbone of any length, and wherein n, x, y, a, b, c, d, and e is each independently an integer greater than 1.

Examples of suitable polymer backbones include, but are not limited to, substituted or unsubstituted polydienes, such as poly(butadiene) (PB) and poly(isoprene), and substituted or unsubstituted polyolefins, such as polyisobutylene (PIB) and ethylene-butene copolymers, poly(norbornene), poly(octene), polystyrene (PS), poly(siloxanes), polyacrylates with alkyl side chains, polyesters, and/or polyurethanes, and any combination thereof. In certain embodiments, the polymer backbone of the associative polymers may be substantially soluble in a non-aqueous composition.

As used herein, the term "functional group" may refer to specific groups of atoms within a molecular structure that are responsible for the characteristic physical and/or chemical reactions of that structure and in particular to physical and/or chemical associative interactions of that structure. In certain embodiments, the functional groups of the associative polymers used in the methods and compositions of the present disclosure may include, but are not limited to, carboxylic acids, sulfonic acids, phosphonic acids, amines, alcohols, nucleotides, hydrogen atoms, diacetamidopyridine, thymine, Hamilton Receptors, cyanuric acid, and any combination thereof.

In certain embodiments, one or more functional groups of an associative polymer may be capable of undergoing an associative interaction with at least one functional group of another associative polymer. In such embodiments, the associative interaction may have an association constant (k) of from $0.1 < \log_{10} k < 8$, and in some embodiments, in the range of $4 < \log_{10} k < 14$, such that the strength of the associative interaction is less than that of a covalent bond between atoms and, in particular, the atoms of the polymer backbone. In certain embodiments, the associative polymers may be telechelic. In certain embodiments, the functional groups of two or more associative polymers may undergo associative interactions to self-assemble or form into one or more supramolecular assemblies. In such embodiments, the supramolecular assemblies may be linear, branched, cyclic, or combinations thereof.

In certain embodiments, the associative interaction between the functional groups may be due to, for example, reversible noncovalent interaction between the associative polymers that enables a discrete number of molecular subunits or components to be assembled, typically with an individual interaction strength less than that of a covalent bond. Examples of such interactions include, but are not limited to, cationic-anionic interactions, self-associative hydrogen bonds (H-bonds) (such as homonuclear hydrogen bonding (e.g. carboxylic acids, alcohols), heteronuclear hydrogen bond donor-acceptor pairing (e.g. carboxylic aids-amines)) donor-acceptor H-bonds, Brønsted or Lewis acid-base interactions (e.g., transition metal center-electron pair donor ligand such as palladium (II) and pyridine, or iron and tetraaceticacid, or others identifiable to a skilled person as moieties that participate in metal-ligand interactions or metal-chelate interactions), electrostatic interactions (e.g., tetraalkylammonium-tetraalkylborate), pi-acid/pi-base or quadrupolar interactions (e.g., arene-perfluoroarene), interactions between nucleotides, charge transfer complex formation (e.g., carbazole-nitroarene), or other supramolecular interactions, and combinations of these interactions (e.g., proteins, biotin-avidin).

In certain embodiments, the functional groups of associative polymers may associate in a donor/acceptor association. In such embodiment, one functional group of an associative polymer is a donor while another, different functional group of an associative polymer (either the same or different) is the acceptor, such that the donor and acceptor functional groups undergo an associative interaction. In the donor/acceptor association, the donor and acceptor can be stoichiometric (e.g. equal numbers of donor and acceptor functional groups) or non-stoichiometric (e.g. more donor groups than acceptor groups or vice versa). In other embodiments, the functional groups of associative polymers may associate in a self-to-self association. In such embodiments, one or more functional groups of an associative polymer may interact with identical functional groups of an associative polymer (either the same or different).

In certain embodiments, the associative polymer may have an overall weight average molecular weight (Mw) equal to or less than about 2,000,000 g/mol. In some embodiments, the associative polymer may have an overall weight average molecular weight (Mw) equal to or greater than about 100,000 g/mol. In some embodiments, the associative polymer may have an overall weight average molecular weight (Mw) from about 100,000 g/mol to about 1,000,000 g/mol. In certain embodiments, the polymer backbone and functional groups can be selected such that the associative polymer has a ratio of carbon atoms to heteroatoms greater than about 1000:1. In certain embodiments, the polymer backbone and functional groups can be selected such that the associative polymer has a ratio of carbon atoms to heteroatoms greater than about 2,000:1. In certain embodiments, the polymer backbone and functional groups can be selected such that the associative polymer has a ratio of carbon atoms to heteroatoms greater than about 10,000:1.

In one or more embodiments, the associative polymers used in the methods and compositions of the present disclosure may be present in the treatment fluid in an amount less than 10% by weight of the non-aqueous fluid. In one or more embodiments, the associative polymers used in the methods and compositions of the present disclosure may be present in the treatment fluid in an amount less than 5% by weight of the non-aqueous fluid. In one or more embodiments, the associative polymers used in the methods and compositions of the present disclosure may be present in the treatment fluid in an amount less than 1% by weight of the non-aqueous fluid. In one or more embodiments, the associative polymers used in the methods and compositions of the present disclosure may be present in the treatment fluid in an amount less than 0.75% by weight of the non-aqueous fluid. In one or more embodiments, the associative polymers used in the methods and compositions of the present disclosure may be present in the treatment fluid in an amount less than 0.5% by weight of the non-aqueous fluid. In one or more embodiments, the associative polymers used in the methods and compositions of the present disclosure may be present in the treatment fluid in an amount less than 0.25% by weight of the non-aqueous fluid. In one or more embodiments, the associative polymers used in the methods and compositions of the present disclosure may be present in the treatment fluid in an amount less than 0.1% by weight of the non-aqueous fluid. In one or mom embodiments, the associative polymers used in the methods and compositions of the present disclosure may be present in the treatment fluid in an amount less than 0.05% by weight of the non-aqueous fluid. In one or more embodiments, the associative polymers used in the methods and compositions of the present disclosure may be present in the treatment fluid in an amount less than 0.01% by weight of the non-aqueous fluid.

In certain embodiments, one or more of the associative polymers may be capable of undergoing an associative interaction with itself or another associative polymer (e.g., via functional groups at one or mom ends of the polymer backbone). In certain embodiments, the associative polymers may form one or more supramolecular assemblies within a non-aqueous fluid, which, in turn, may increase the rheological properties (e.g., viscosity) of the fluid. In some embodiments, the associative polymers may form one or more supramolecular assemblies prior to being introduced to a non-aqueous fluid which, in turn, may increase the rheological properties (e.g., viscosity) of the fluid after introduction. In certain embodiments, the supramolecular assemblies may form and thereby increase the rheological properties of the fluid at low shear conditions. Examples of low shear conditions include, but are not limited to, static conditions, pumping at low speeds, and drilling at low speeds.

In certain embodiments, the one or more supramolecular assemblies within the non-aqueous fluid may be broken into one or more polymer strands, which, in turn, may affect the rheological properties (e.g., reduce the viscosity) of the fluid. In certain embodiments, the polymer strands may be the associative polymers that formed the supramolecular assemblies. In such embodiments, the assembly of the supramolecular assemblies may be reversible. In certain embodiments, the supramolecular assemblies may be broken by overcoming the associative interaction between the functional groups of the associative polymers. In certain embodiments, the supramolecular assemblies may be broken by subjecting the supramolecular assemblies to high shear conditions, such as drilling. In certain embodiments, the supramolecular assemblies may be broken by introducing a chemical breaker (e.g., acids, oxidizers, bases, certain ions, enzymes) into the fluid containing the supramolecular assemblies. In some embodiments, a combination of breaking methods may be used.

In certain embodiments, the increase of the rheological properties of the fluid (e.g., thickening of the fluid) may occur very rapidly upon a transition from a high shear condition to a low shear condition. In certain embodiments, the reduction of the fluid rheology (e.g., thinning of the fluid) may occur very rapidly upon a transition from a low shear condition to a high shear condition and/or upon breaking of the supramolecular assemblies through other means (e.g., chemical breaker). In certain embodiments, the modification of the fluid rheology (e.g., increase and/or reduction) may occur nearly instantaneously.

In certain embodiments, treatment fluids used in the methods and compositions of the present disclosure optionally may include any number of additives. Examples of such additives include, but are not limited to, salts, surfactants, acids, diverting agents, fluid loss control additives, gas, nitrogen, carbon dioxide, surface modifying agents, tackifying agents, foamers, corrosion inhibitors, scale inhibitors, emulsifiers, catalysts, clay stabilizers, shale inhibitors, biocides, friction reducers, antifoam agents, bridging agents, flocculants, $H_2S$ scavengers, $CO_2$ scavengers, oxygen scavengers, lubricants, hydrocarbons, viscosifying/gelling agents, breakers, weighting agents, relative permeability modifiers, resins, wetting agents, coating enhancement agents, filter cake removal agents, antifreeze agents (e.g., ethylene glycol), proppant particles, and the like. A person skilled in the art, with the benefit of this disclosure, will recognize the types of additives that may be included in the treatment fluids of the present disclosure for a particular application.

In one or more embodiments, the treatment fluids of the present disclosure may include one or more weighting agents. Examples of suitable weighting agents that may be used in the treatment fluids of the present disclosure include, but are not limited to, barite, hematite, ilmenite, manganese tetraoxide, calcium carbonate, lead sulfide (galena), and any combinations thereof. In certain embodiments, the weighting agent may be present in the treatment fluid in an amount from about 0.001% to about 40% by volume of the treatment fluid. In other embodiments, the weighting agent may be present in the treatment fluid in an amount from about 5% to about 30% by volume of the treatment fluid. In other embodiments, the weighting agent may be present in the treatment fluid in an amount from about 10% to about 25% by volume of the treatment fluid.

In one or more embodiments, the treatment fluids of the present disclosure may include one or more bridging agents. Examples of suitable bridging agents that may be used in the treatment fluids of the present disclosure include, but are not limited to, calcium carbonate, magnesium oxide, sodium chloride, and any combinations thereof. In certain embodiments, the bridging agent may be present in the treatment fluid in an amount from about 0.001 b/bbl to about 100 lb/bbl of the treatment fluid. In other embodiments, the bridging agent may be present in the treatment fluid in an amount from about 5 lb/bbl to about 80 lb/bbl of the treatment fluid. In other embodiments, the bridging agent may be present in the treatment fluid in an amount from about 10 lb/bbl to about 60 lb/bbl of the treatment fluid.

In one or more embodiments, the treatment fluids of the present disclosure may include one or more emulsifiers. Examples of suitable emulsifiers that may be used in the treatment fluids of the present disclosure include, but are not limited to, amidoamines, alkyl sulfonates, oxidized tall oil ethoxylated alcohols, fatty acid derivatives, sorbitan esters, and any combination thereof. In certain embodiments, the emulsifier may be present in the treatment fluid in an amount from about 1 lb/bbl to about 30 lb/bbl of the treatment fluid. In other embodiments, the emulsifier may be present in the treatment fluid in an amount from about 3 lb/bbl to about 25 lb/bbl of the treatment fluid. In other embodiments, the emulsifier may be present in the treatment fluid in an amount from about 5 lb/bbl to about 20 lb/bbl of the treatment fluid.

In one or more embodiments, the treatment fluids of the present disclosure may include one or more wetting agents. Examples of suitable wetting agents that may be used in the treatment fluids of the present disclosure include, but are not limited to, soy lecithin, alkyl benzene sulfonic acid salts, and any combination thereof. In certain embodiments, the wetting agent may be present in the treatment fluid in an amount from about 0 lb/bbl to about 5 lb/bbl of the treatment fluid. In other embodiments, the wetting agent may be present in the treatment fluid in an amount from 0 lb/bbl to about 3 lb/bb of the treatment fluid. In other embodiments, the wetting agent may be present in the treatment fluid in an amount from 0 lb/bbl to about 1.5 lb/bbl of the treatment fluid.

In one or more embodiments, the associative polymers used in the methods and compositions of the present disclosure may be added to the non-aqueous fluid along with any other additives at a well site where the operation or treatment is conducted, either by batch mixing or continuous ("on-the-fly") mixing. The term "on-the-fly" is used herein to include methods of combining two or more components wherein a flowing stream of one element is continuously introduced into a flowing stream of another component so that the streams are combined and mixed while continuing to flow as a single stream as part of the on-going treatment. Such mixing can also be described as "real-time" mixing. In other embodiments, the treatment fluids of the present disclosure may be prepared, either in whole or in part, at an offsite location and transported to the site where the treatment or operation is conducted. In introducing a treatment fluid into a portion of a subterranean formation, the components of the treatment fluid may be mixed together at the surface and introduced into the formation together, or one or more components may be introduced into the formation at the surface separately from other components such that the components mix or intermingle in a portion of the formation to form a treatment fluid. In either such case, the treatment fluid is deemed to be introduced into at least a portion of the subterranean formation for purposes of the present disclosure.

Some embodiments of the present disclosure provide methods for using the disclosed compositions and treatment fluids to carry out a variety of subterranean treatments, including but not limited to, drilling. The drilling fluids disclosed herein may directly or indirectly affect one or more components or pieces of equipment associated with the preparation, delivery, recapture, recycling, reuse, and/or disposal of the drilling fluids. For example, and with reference to FIG. 1, the drilling fluids disclosed herein may directly or indirectly affect one or more components or pieces of equipment associated with a wellbore drilling assembly 100, according to one or more embodiments. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a borehole 116 that penetrates various subterranean formations 118.

A pump 120 (e.g., a mud pump) circulates a drilling fluid 122 prepared with the compositions disclosed herein through a feed pipe 124 and to the kelly 110, which conveys the drilling fluid 122 downhole through the interior of the drill string 108 and through one or mom orifices in the drill bit 114. The drilling fluid 122 is then circulated back to the surface via an annulus 126 defined between the drill string 108 and the walls of the borehole 116. At the surface, the recirculated or spent drilling fluid 122 exits the annulus 126 and may be conveyed to one or more fluid processing unit(s) 128 via an interconnecting flow line 130. After passing through the fluid processing unit(s) 128, a "cleaned" drilling fluid 122 is deposited into a nearby retention pit 132 (i.e., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the disclosure.

The associative polymers used in the methods and compositions of the present disclosure may be added to the drilling fluid 122 via a mixing hopper 134 communicably coupled to or otherwise in fluid communication with the retention pit 132. The mixing hopper 134 may include, but is not limited to, mixers and related mixing equipment known to those skilled in the art. In other embodiments, however, the associative polymers used in the methods and compositions of the present disclosure may be added to the drilling fluid 122 at any other location in the drilling assembly 100. In at least one embodiment, for example, there could be more than one retention pit 132, such as multiple retention pits 132 in series. Moreover, the retention pit 132 may be representative of one or more fluid storage facilities and/or units where the associative polymers used in the methods and compositions of the present disclosure thereof may be stored, reconditioned, and/or regulated until added to the drilling fluid 122.

As mentioned above, the drilling fluid 122 prepared with a composition disclosed herein may directly or indirectly affect the components and equipment of the drilling assembly 100. For example, the disclosed drilling fluid 122 may directly or indirectly affect the fluid processing unit(s) 128 which may include, but is not limited to one or more of a shaker (e.g., shale shaker), a centrifuge, a hydrocyclone, a separator (including magnetic and electrical separators), a desilter, a desander, a filter (e.g., diatomaceous earth filters), a heat exchanger, any fluid reclamation equipment. The fluid processing unit(s) 128 may further include one or more sensors, gauges, pumps, compressors, and the like used to store, monitor, regulate, and/or recondition the drilling fluid 122.

The drilling fluid 122 prepared as disclosed herein may directly or indirectly affect the pump 120, which representatively includes any conduits, pipelines, trucks, tubulars, and/or pipes used to fluidically convey the drilling fluid 122 downhole, any pumps, compressors, or motors (e.g., topside or downhole) used to drive the drilling fluid 122 into motion, any valves or related joints used to regulate the pressure or flow rate of the drilling fluid 122, and any sensors (i.e., pressure, temperature, flow rate, etc.), gauges, and/or combinations thereof, and the like. The disclosed drilling fluid 122 may also directly or indirectly affect the mixing hopper 134 and the retention pit 132 and their assorted variations.

The drilling fluid 122 prepared as disclosed herein may also directly or indirectly affect the various downhole equipment and tools that may come into contact with the drilling fluid 122 such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 100. The disclosed drilling fluid 122 may also directly or indirectly affect any downhole beat exchangers, valves and corresponding actuation devices, tool seals, packers and other wellbore isolation devices or components, and the like associated with the wellbore 116. The disclosed drilling fluid 122 may also directly or indirectly affect the drill bit 114, which may include, but is not limited to, roller cone bits, PDC bits, natural diamond bits, any hole openers, reamers, coring bits, etc.

While not specifically illustrated herein, the drilling fluid 122 prepared as disclosed herein may also directly or indirectly affect any transport or delivery equipment used to convey the drilling fluid 122 to the drilling assembly 100 such as, for example, any transport vessels, conduits, pipelines, trucks, tubulars, and/or pipes used to fluidically move the drilling fluid 122 from one location to another, any pumps, compressors, or motors used to drive the drilling fluid 122 into motion, any valves or related joints used to regulate the pressure or flow rate of the drilling fluid 122, and any sensors (i.e., pressure and temperature), gauges, and/or combinations thereof, and the like.

An embodiment of the present disclosure is a method including: introducing a treatment fluid into a wellbore penetrating at least a portion of a subterranean formation, wherein the treatment fluid comprises a non-aqueous fluid and one or more associative polymers.

In one or more embodiments described in the preceding paragraph, the associative polymer is present in the treatment fluid in an amount less than 10% by weight of the non-aqueous fluid. In one or more embodiments described in the preceding paragraph, the one or more associative polymers each comprises a polymer backbone and one or more functional groups on at last two ends of the polymer backbone. In one or more embodiments described in the preceding paragraph, the polymer backbone comprises a polymer selected from the group consisting of: a substituted or unsubstituted polydiene, poly(butadiene), poly(isoprene), a substituted or unsubstituted polyolefin, an ethylene-butene copolymer, polyisobutylene, poly(norbornene), poly(octene), polystyrene, a poly(siloxane), a polyacrylate with one or more alkyl side chains, a polyester, polyurethane, and any combination thereof. In one or more embodiments described in the preceding paragraph, the one or more functional groups are selected from the group consisting of: a carboxylic acid, a sulfonic acid, a phosphonic acid, an amine, an alcohol, a nucleotide, a hydrogen atom, diacetamidopyridine, thymine, a Hamilton Receptor, cyanuric acid, and any combination thereof. In one or more embodiments described in the preceding paragraph, allowing the one or more associative polymers to form one or more supramolecular assemblies thereby increasing the viscosity of the treatment fluid. In one or more embodiments described in the preceding paragraph, the one or more associative polymers each has a molecular weight from about 100,000 g/mol to about 1,000,000 g/mol.

Another embodiment of the present disclosure is a method including; providing a drilling fluid comprising a non-aqueous fluid and one or more associative polymers; and drilling at least a portion of a wellbore in a subterranean formation using at least the drilling fluid.

In one or more embodiments described in the preceding paragraph, the associative polymer is present in the drilling fluid in an amount less than about 10% by weight of the non-aqueous fluid. In one or more embodiments described in the preceding paragraph, the one or more associative polymers each comprise a polymer backbone and one or more functional groups on at least two ends of the polymer backbone. In one or more embodiments described in the preceding paragraph, the polymer backbone comprises at least one polymer selected from the group consisting of: a substituted or unsubstituted polydiene, poly(butadiene), poly(isoprene), a substituted or unsubstituted polyolefin, an ethylene-butene copolymer, polyisobutylene, poly(norbornene), poly(octene), polystyrene, poly(siloxanes), polyacrylates with alkyl side chains, polyesters, polyurethane, and any combination thereof. In one or more embodiments described in the preceding paragraph, the one or more functional groups are selected from the group consisting of: a carboxylic acid, a sulfonic acid, a phosphonic acid, an amine, an alcohol, a nucleotide, a hydrogen atom, diacetamidopyridine, thymine, a Hamilton Receptor, cyanuric acid, and any combination thereof. In one or more embodiments described in the preceding paragraph, allowing the one or more associative polymers to form one or more supramolecular assemblies thereby increasing the viscosity of the drilling fluid; and breaking the one or more supramolecular assemblies into one or more polymeric strands thereby reducing the viscosity of the treatment fluid. In one or more embodiments described in the preceding paragraph, the one or more associative polymers each has a molecular weight from about 100,000 g/mol to abut 1,000,000 g/mol.

Another embodiment of the present disclosure is a composition including: a non-aqueous fluid; a weighting agent; and one or more associative polymers that are capable of associating to form one or more supramolecular assemblies.

In one or more embodiments described in the preceding paragraph, the associative polymer is present in the composition in an amount less than 10% by weight of the non-aqueous fluid. In one or more embodiments described in the preceding paragraph, the one or more associative polymers each comprise a polymer backbone and one or more functional groups on at least two ends of the polymer backbone. In one or more embodiments described in the preceding paragraph, the non-aqueous fluid comprises at least one fluid selected from the group consisting of: an oil, a hydrocarbon, an organic liquid, and any combination thereof. In one or more embodiments described in the preceding paragraph, the non-aqueous fluid is an oil phase of an emulsion. In one or more embodiments described in the preceding paragraph, the composition further comprising one or more additives selected from the group consisting of: a bridging agent, an emulsifier, a wetting agent, and any combination thereof.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below, it is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee. Any definitions or disclaimers in the references incorporated herein by reference should not be interpreted as limiting the present claims. If there is any conflict in the usage of a word, term, or phrase in the present specification and the references incorporated herein by reference, then the usage in present specification controls.

What is claimed is:

1. A method comprising:
   introducing a drilling fluid into a wellbore penetrating at least a portion of a subterranean formation, wherein the drilling fluid comprises one or more associative polymers in a non-aqueous fluid, wherein the non-aqueous fluid is an oil-based fluid or the non-aqueous phase of an emulsion;
   allowing the one or more associative polymers to form one or more first supramolecular assemblies in the non-aqueous fluid thereby increasing the viscosity of the drilling fluid; and
   drilling at least a portion of the wellbore in the subterranean formation using the drilling fluid, wherein drilling at least the portion of the wellbore at least partially breaks the one or more first supramolecular assemblies into one or more polymeric strands thereby reducing the viscosity of the drilling fluid.

2. The method of claim 1, wherein the one or more associative polymers is present in the drilling fluid in an amount less than 10% by weight of the non-aqueous fluid.

3. The method of claim 1, wherein the one or more associative polymers each comprises a polymer backbone and one or more functional groups on at least two ends of the polymer backbone.

4. The method of claim 3, wherein the polymer backbone comprises a polymer selected from the group consisting of: a substituted or unsubstituted polydiene, poly(butadiene), poly(isoprene), a substituted or unsubstituted polyolefin, an ethylene-butene copolymer, polyisobutylene, poly(norbornene), poly(octene), polystyrene, a poly(siloxane), a polyacrylate with one or more alkyl side chains, a polyester, polyurethane, and any combination thereof.

5. The method of claim 3, wherein the one or more functional groups are selected from the group consisting of: a carboxylic acid, a sulfonic acid, a phosphonic acid, an amine, an alcohol, a nucleotide, a hydrogen atom, diacetamidopyridine, thymine, a Hamilton Receptor, cyanuric acid, and any combination thereof.

6. The method of claim 1, wherein the one or more associative polymers each has a molecular weight from about 100,000 g/mol to about 1,000,000 g/mol.

7. The method of claim 1, wherein the non-aqueous fluid comprises at least one fluid selected from the group consisting of: an oil, a hydrocarbon, an organic liquid, and any combination thereof.

8. The method of claim 1, wherein the drilling fluid further comprises a weighting agent.

9. The method of claim 1, wherein the drilling fluid further comprises one or more additives selected from the group consisting of: a bridging agent, an emulsifier, a wetting agent, and any combination thereof.

10. The method of claim 1, wherein the one or more first supramolecular assemblies are reversibly broken into the one or more polymeric strands.

11. The method of claim 10, wherein the one or more polymeric strands form one or more second supramolecular assemblies in the non-aqueous fluid after drilling at least the portion of the wellbore is slowed or stopped.

12. The method of claim 1, further comprising adding a chemical breaker to the drilling fluid to at least partially break the one or more first supramolecular assemblies into the one or more polymeric strands.

\* \* \* \* \*